(12) United States Patent
Flynn et al.

(10) Patent No.: US 6,752,858 B1
(45) Date of Patent: Jun. 22, 2004

(54) CIRCUMFERENTIAL AIR KNIFE AND APPLICATIONS

(75) Inventors: Harry Eugene Flynn, Edmond, OK (US); Joe Bert Maker, Guthrie, OK (US); Leslie E. Crowder, Columbus, MS (US); Johnny B. Perkins, Hamilton, MS (US)

(73) Assignee: Kerr-McGee Chemical, LLC, Oklahoma City, OK (US)

( * ) Notice: Subject to any disclaimer, the term of this patent is extended or adjusted under 35 U.S.C. 154(b) by 0 days.

(21) Appl. No.: 10/318,796

(22) Filed: Dec. 13, 2002

(51) Int. Cl.$^7$ .............................................. B01D 35/16
(52) U.S. Cl. ..................... 95/271; 55/431; 55/459.1; 55/466
(58) Field of Search ............................. 95/271; 55/430, 55/431, 428, 466, 459.1; 134/22.12, 22.15, 22.18

(56) References Cited

U.S. PATENT DOCUMENTS

| | | | |
|---|---|---|---|
| 4,125,385 A | 11/1978 | Rado et al. ................... 55/269 |
| 5,042,169 A | * 8/1991 | Vero ............................ 34/591 |
| 5,620,643 A | * 4/1997 | Maiden et al. .............. 264/117 |
| 5,665,160 A | 9/1997 | Davene et al. ................ 118/63 |
| 6,206,175 B1 | 3/2001 | Tschantz ..................... 198/493 |
| 6,399,033 B1 | 6/2002 | Hartmann .................... 423/74 |
| 6,423,291 B1 | 7/2002 | Stone et al. ................ 423/492 |

* cited by examiner

Primary Examiner—Robert A. Hopkins
(74) Attorney, Agent, or Firm—Law Office of Stanley K. Hill, PLC

(57) ABSTRACT

A novel air knife. The novel air knife is circumferential. That is, the novel air knife injects a gas stream along the inside walls of the air knife. The air knife can be advantageously placed at or near the entrance to a suspension vessel to reduce buildup of solid materials transported to the suspension vessel. The gas stream is injected at a rate sufficient to reduce the buildup of solid materials on the walls of the air knife (and thus the entrance to the suspension vessel). The air circumferential air knife is particularly useful in a TiCl$_4$ production process for reducing buildup of hygroscopic cyclone dust at the entrance to a suspension vessel.

18 Claims, 3 Drawing Sheets

CIRCUMFERENTIAL AIR KNIFE AND APPLICATIONS

FIELD OF THE INVENTION

The present invention generally relates to the use of a novel air knife to help prevent solid particulates from blocking the entrance to a vessel. More specifically, the present invention is particularly useful for reducing blockage by solid chlorides removed from a titanium tetrachloride product gas by a cyclone or by some other gas/solids separation device, in processes for producing titanium tetrachloride.

BACKGROUND AND SUMMARY OF THE INVENTION

The production of titanium tetrachloride ("$TiCl_4$") via the chlorination of titanium values in a titanium-containing starting material is generally known in the art. The production of $TiCl_4$ is useful, for example, in the production of titanium metal or titanium dioxide ("$TiO_2$").

As is known in the art, $TiCl_4$ can be produced by reacting chlorine gas with titanium-containing starting materials in a chlorinator. During this process, a solids-laden gas mixture comprised of the desired $TiCl_4$ gas and residual solid chlorides is removed from the chlorinator, cooled, and conventionally is then transferred to a cyclone separator to remove the solids from the solids-laden gas mixture. The solids are then dumped into a suspension vessel, frequently referred to as a chlorinator sump, where the solids are mixed with water to form a suspension.

These removed solids are typically very warm upon entering the suspension vessel. The mixing of these hot solids with water in the suspension vessel results in a high humidity gas phase in the space above the suspension in the vessel, including the length of pipe that carries the cyclone dust from the cyclone to the suspension vessel. The cyclone dust contains metal chlorides, which are hygroscopic, and as such become sticky when entering the high humidity areas of the pipe that transfers the cyclone dust from the cyclone to the suspension vessel. The sticky solids gradually build up on the walls of the pipe until the pipe is completely plugged, stopping further discharge of solids from the cyclone. Clearing the blockage requires operation downtime to unclog and can be a safety hazard.

The present invention addresses the issues presented above by placing a novel air knife at or near the entrance to the suspension vessel. The cyclone dust passes through the air knife on its way to the suspension vessel. The novel air knife is circumferential. That is, the novel air knife injects a gas stream along the inside walls of the air knife. The gas stream is injected at a rate sufficient to reduce the buildup of hygroscopic cyclone dust on the walls of the air knife (and thus at the entrance to the chlorinator sump), so that the chlorinator sump can continue to receive solids from the cyclone, improving time-on-line and safety.

In one embodiment, the present invention is a novel air knife adapted to reduce hygroscopic solids from building up at the entrance to a suspension vessel enclosing a high-humidity environment. In a second embodiment, the present invention is a method for preventing hygroscopic solids from building up at the entrance to a suspension vessel enclosing a high-humidity environment.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION OF PREFERRED EMBODIMENTS OF THE INVENTION

In the following detailed description of the present invention, reference is made to the accompanying Drawings, which form a part hereof, and in which are shown by way of illustration specific embodiments in which the present invention may be practiced. It should be understood that other embodiments may be utilized and structural changes may be made without departing from the scope of the present invention.

Figure 1:
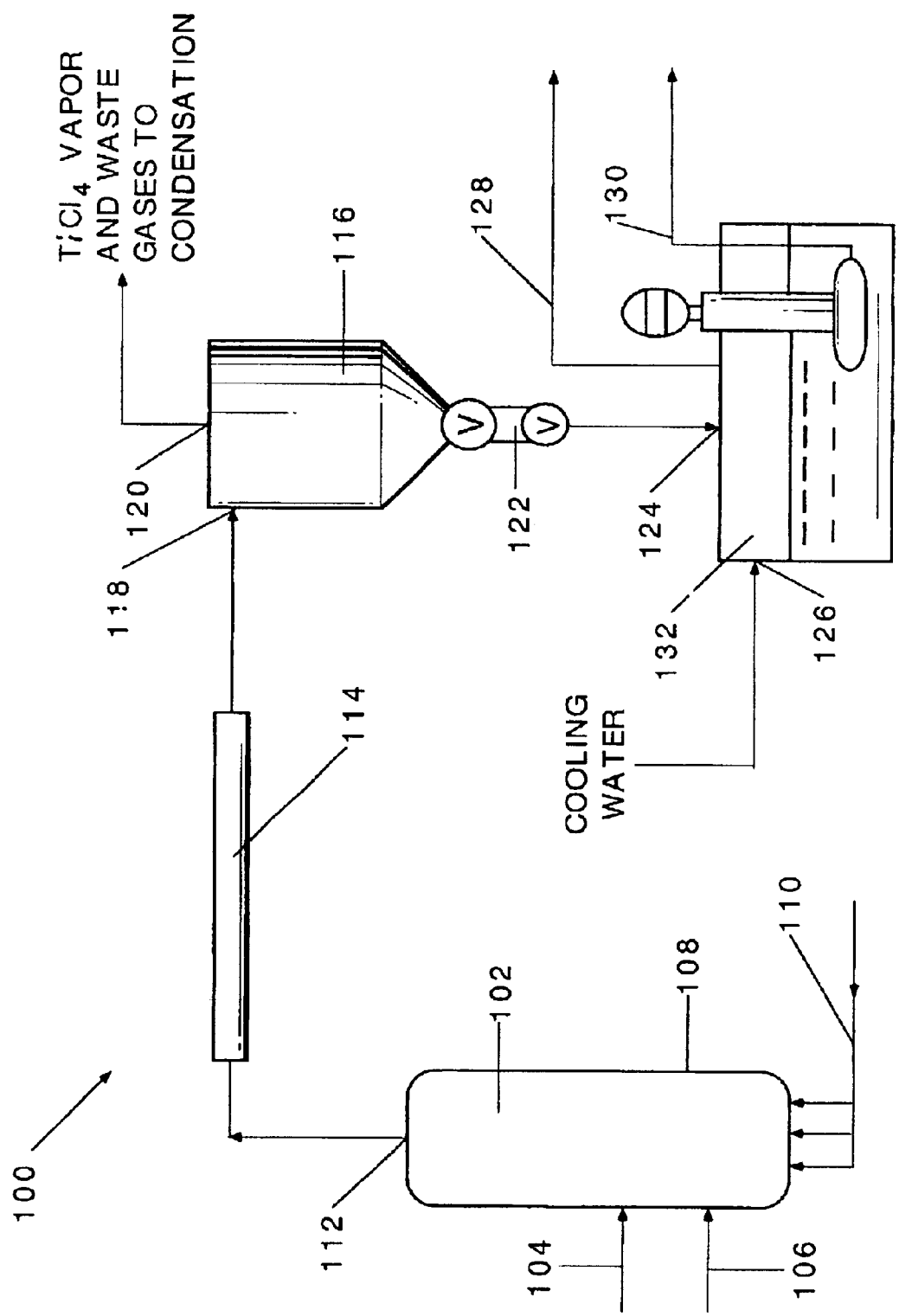
FIG. 1 illustrates a diagram of a $TiCl_4$ production process.

FIG. 1 illustrates a schematic of a typical $TiCl_4$ production process 100. The process 100 illustrated in FIG. 1 involves chlorination of titanium-bearing ores. Ore 104 and coke 106, preferably petroleum coke, are conveyed to a chlorinator 102 on a timed basis to maintain a certain bed level 108 and composition. Chlorine gas 110 is fed up to the bed through a distributor in the bottom of the chlorinator 102. The chlorination reaction occurs as the chlorine gas 110 flows up through the bed. Most of the titanium values in the bed are reacted to form $TiCl_4$. Metal oxides in the ore 104 largely are converted into gaseous metal chlorides. Other gases are also formed including considerable amounts of carbon dioxide ("$CO_2$") and carbon monoxide ("CO"). Impurities in the ore are also chlorinated, forming chlorides such as $FeC_2$ and $MnCl_2$, for example.

A hot reaction solids-laden gas mixture exits 112 from the chlorinator 102 and typically may comprise CO, $CO_2$, COS, HCl, $N_2$, low-boiling and high-boiling chlorides such as $TiCl_4$, $FeCl_3$, $FeCl_2$, $MnCl_2$, $SnCl_4$, $SiCl_4$, $VOCl_3$, $NaAlCl_4$, and unreacted solids such $TiO_2$, $SiO_2$ as well as unburned coke. The solids-laden gas mixture is cooled in a cooling conduit 114, sometimes referred to as a chlorinator crossover, and then sent to a cyclone separator 116 where the gases and solids are separated.

Cyclone separators comprise well known means for separating gases and solids from mixtures of the same. Cyclone separators generally are constructed of the tubular or cylindrical-shaped main body connected to a lower tapered conical portion. A tangential side inlet is provided near the top of the cylindrical main body. A gas outlet tube is provided and generally extends downwardly through the cyclone top into the main body of the cyclone. The tube usually must extend down to a level slightly below the lowest portion of the inlet to assure efficient separation of solids and gases.

In operation, the solids-laden gases are introduced at high velocity through the tangential inlet. They follow a vortex-shaped path around the outside of the gas outlet pipe downwardly towards the bottom of the separator. The solids, which are heavier than the gases, are thrown against the walls of the cyclone by centrifugal force. Gravity then causes the solids to fall to the bottom of the cyclone. The separated gas follows a vortex path upwardly and passes out of the top of the cyclone separator through the gas outlet tube. The separated solids flow through a solids outlet at the base of the tapered conical section. These separated solids are typically referred to as cyclone dust or waste solids.

To minimize the amount of gas that is dumped along with the cyclone dust, a two-valve dump spool leg is typically used on the bottom of the cyclone. The opening and closing of these valves is interlocked so only one valve can possibly be open at any given time. When the top valve is opened, the bottom is closed. This allows cyclone dust to fall through the top valve and fill the dump spool leg. When the top valve closes, the bottom valve is opened to empty the dump spool leg to the suspension vessel. The valves continuously operate on a timer.

In FIG. 1, the solids-laden gas mixture flows from the chlorinator crossover 114 into the cyclone 116 through a tangential inlet 118. The gases from the solids-laden gas mixture exit cyclone 116 through the gas outlet tube 120 at the top of the cyclone 116 and the solids exit the cyclone 116 through the dump spool leg 122 at the base of the cyclone 116.

The cyclone dust collected at the bottom of the cyclone exits the bottom of the cyclone, is transported through a tube or pipe by force of gravity, and is deposited into a suspension vessel. The section of pipe connecting the cyclone and the suspension vessel can vary in length, typically being from about 20 feet to about 50 feet in length.

The suspension vessel frequently is referred to as a chlorinator sump. Once deposited into the suspension vessel, the cyclone dust is mixed with water to form a suspension. Typically, any gas in the suspension vessel is removed through a vent in the top of the vessel and the suspension is pumped out of the vessel as waste or for further processing. FIG. 1 shows the cyclone dust 124 entering the suspension vessel 132, water 126 being added to the suspension vessel 132, gas 128 being removed from the suspension vessel 132, and suspension 130 being pumped out of the suspension vessel 132.

The cyclone dust is typically very warm upon entering the suspension vessel. The mixing of these hot solids with water in the suspension vessel results in a high humidity gas phase in the space above the suspension in the vessel. This high-humidity environment can extend into the length of pipe that carries the cyclone dust from the cyclone to the suspension vessel. The cyclone dust contains metal chlorides, which are hygroscopic, and as such become sticky when entering the high humidity areas of the pipe that transfers the cyclone dust from the cyclone to the suspension vessel. The sticky solids gradually build up at the opening of the pipe into the suspension vessel or on the walls of the pipe until the pipe is completely plugged, stopping further discharge of solids from the cyclone.

Clearing the blockage requires operation downtime to unclog and can be a safety hazard. Stopping the production process to clear a blockage is not only an economic disadvantage, it creates a risk of gas emissions as allowing an operator access to the inside of the pipe to clear the blockage creates a risk of gas emissions. The blockage can also result in condensed $TiCl_4$ being present, which can hydrolyze explosively should an operator try clearing the line with a water hose.

According to the present invention, a novel air knife is advantageously utilized to reduce or eliminate the buildup of hygroscopic materials on the inside of the pipe that transports the cyclone dust from the cyclone separator to the suspension vessel. The novel air knife is connected to the cyclone separator in the sense that the novel air knife is attached to the tube or pipe that transports cyclone dust from the cyclone to the suspension vessel in a manner that requires the cyclone dust to pass through the air knife either before the dust enters the suspension vessel or as the dust enters the suspension vessel. Preferably, the air knife is placed at or near the entrance to the suspension vessel.

Air knives according to the present invention are circumferential. By circumferential it is meant that the air knife creates a stream of gas inside the air knife along the circumference of the passage in the air knife through which the cyclone dust passes. Typically, the pipe carrying the cyclone dust from the cyclone to the suspension vessel is circular and the inside of the air knife will have a circular passage through which the cyclone dust passes. However, the present invention is not so limited. Other geometric shapes are within the scope of the present invention. For example, the pipe transporting the cyclone dust and the inside passage of the air knife could be oval shaped or even rectangular.

The gas stream created by air knives of the present invention has a velocity sufficient to blow most or all hygroscopic material from the inside wall of the air knife. In this manner, the air knife reduces the amount of hygroscopic material that can accumulate, significantly reducing the chance that the entrance to the suspension vessel can be blocked by accumulated hygroscopic material. When used in a $TiCl_4$ production process to reduce cyclone dust accumulation, the gas stream will preferably have a velocity of at least about 100 feet per second, and more preferably, at least about 200 feet per second. Still more preferably, the gas stream will have a velocity of at least about 400 feet per second. While some applications of the present invention may require a gas stream velocity of greater than 500 feet per second, preferably the gas stream velocity is no more than about 500 feet per second.

The gas stream created by the air knife generally travels in the same direction as the direction in which the hygroscopic material moves through the air knife. In one embodiment, the gas stream travels parallel to the direction of the hygroscopic material. However, it is within the scope of the present invention to adapt the air knife to create a gas stream that travels at an angle to the direction of the hygroscopic material, causing the gas stream to travel in a spiral motion when the air knife passage is circular.

Figure 2:
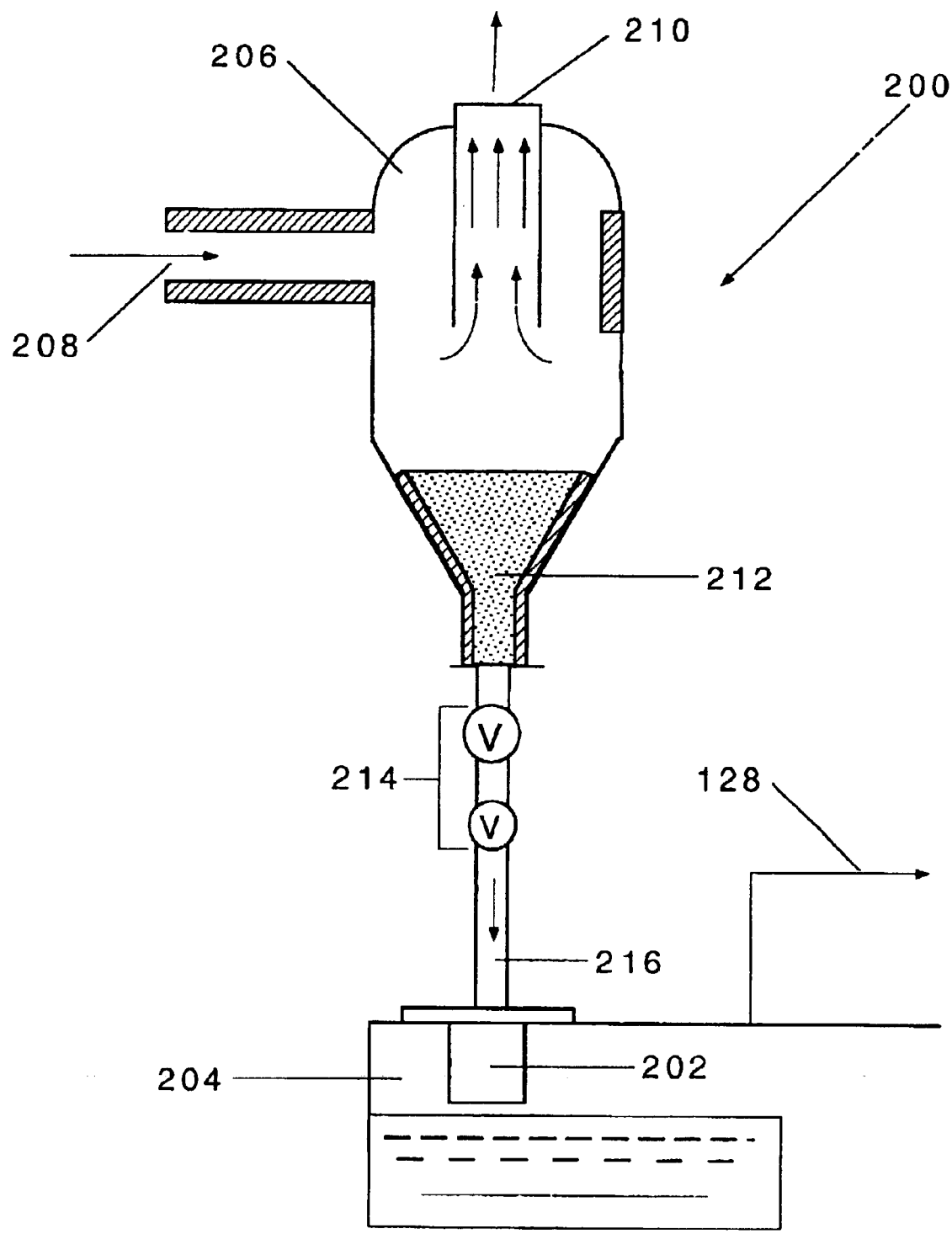
FIG. 2 illustrates a process utilizing an air knife according to the present invention in conjunction with a cyclone separator and a suspension vessel.

FIG. 2 illustrates a process 200 utilizing an air knife 202 according to the present invention in conjunction with a cyclone separator 206 and a suspension vessel 204. The solids-laden gases are introduced into the cyclone separator 206 at the tangential inlet 208. Inside the cyclone separator 206 the solids and gases are separated. The gases exit the cyclone separator through a gas outlet tube 210 and gravity causes the solids to collect at the bottom 212 of the cyclone separator 206. A two-valve dump spool leg 214 minimizes the amount of gas that is dumped along with the cyclone dust. A pipe 216 connects the dump spool leg 214 with the air knife 202. Cyclone dust that is dumped from the two-valve dump spool leg 214 falls through the pipe 216 and through the air knife 202 into the suspension vessel 204.

Figure 3:
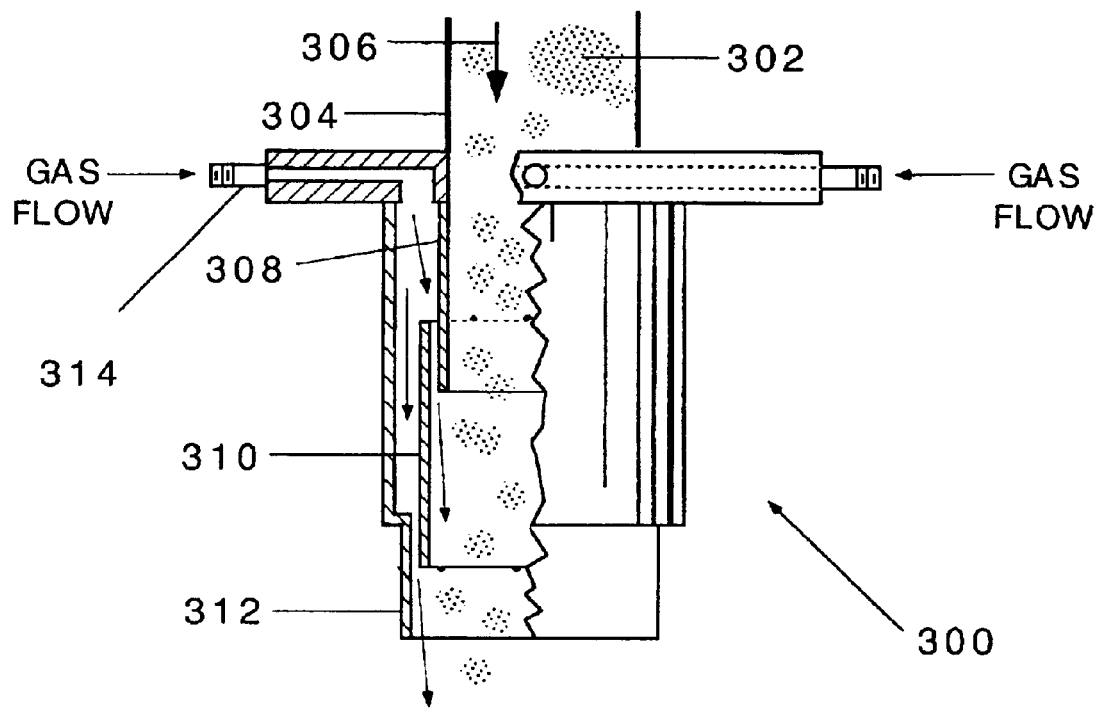
FIG. 3 illustrates a cut-away view of an air knife according to the present invention.

FIG. 3 illustrates a cut away view of an air knife 300 according to the present invention. Hygroscopic material 302 enters the air knife 300 via a pipe 304 such as the pipe 216 shown in FIG. 2 and travels down through the air knife 300 in the direction indicated by the arrow 306.

The air knife 300 comprises three overlapping wall sections 308, 310, and 312. The overlapping portions of the wall sections form gaps through which gas is forced. The gaps face in the same direction in which the cyclone dust moves. By facing in the same direction it is meant that the gas forced through the gaps moves through the air knife in the same direction as the cyclone dust. Preferably, air knives of the present invention will comprise at least two different circumferential gaps through which gas is forced. Generally, the size of the gap (that is, the distance between two wall sections) is no more than about 0.07 inches, and preferably no more than about 0.05 inches. In one embodiment, air knives having a gap size of about 0.036 inches have been advantageously utilized in a $TiCl_4$ production process to keep hygroscopic cyclone dust from accumulating on the walls of the air knife.

Air knives according to the present invention have at least one gas intake. Typically, air knives of the present invention will have between two and four gas intakes. In FIG. 3, gas flows into the gas intake 314 and travels in the direction indicated by the arrows. The gas is forced through the gaps between the wall sections 308, 310, and 312 at a velocity sufficient to blow most or all hygroscopic material from the inside part of the wall sections 308, 310, and 312 of the air knife. The gas velocity is calculated in feet per second in a conventional manner, by dividing the gas flow into the gas intakes (in actual cubic feet per second) by the cross-sectional area of the circumferential gap (in square feet).

Figure 4:
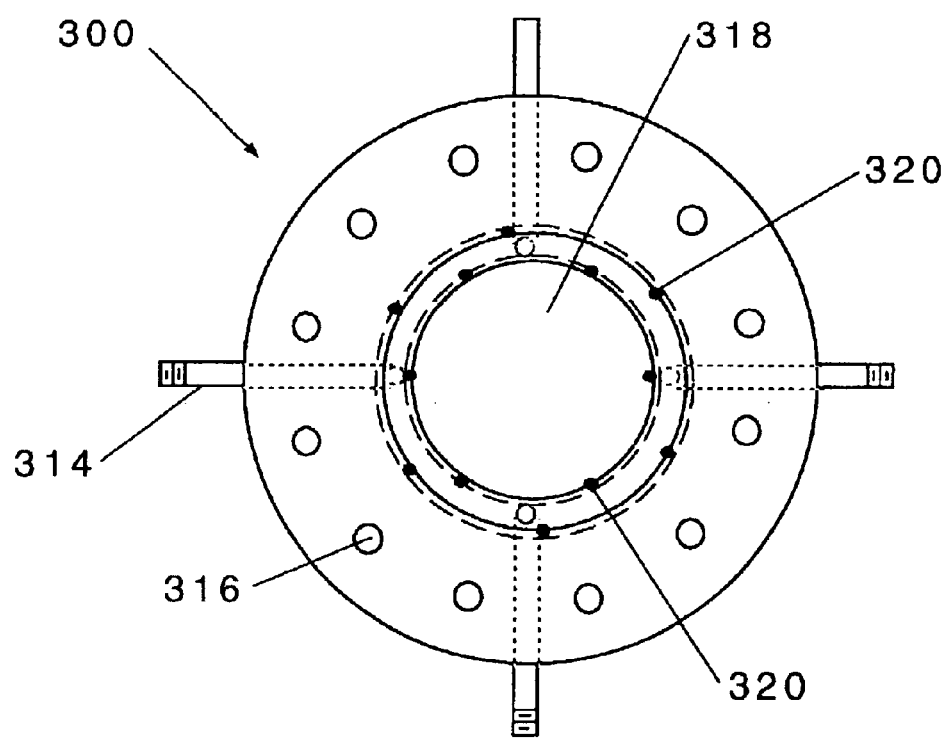
FIG. 4 illustrates a top-down view of the air knife shown in FIG. 3.

FIG. 4 illustrates a top-down view of the air knife 300 shown in FIG. 3. As seen in FIG. 4, the air knife 300 has four gas intakes. The air knife 300 also comprises a series of bolts 316. The bolts 316 on this embodiment of the present invention are used to fasten the air knife 300 to a suspension vessel. However, other methods for attaching air knives to suspension vessels are within the scope of the present invention. FIG. 4 also shows the opening 318 at the center of the air knife 300 through which the cyclone dust passes on its way to the suspension vessel. Air knives according to the present invention have been advantageously utilized at the entrance to a suspension vessel in a $TiCl_4$ production process without requiring additional ventilation in the suspension vessel.

As shown in FIG. 4, the wall sections of the air knife 300 can be attached to each other by small spot welds 320 placed between the wall sections of the air knife 300. That is, these spot welds 320 are in the gaps between the wall sections. The size of the spots welds 320 is not particularly critical so long as they are not so large as to interfere with the flow of gas through the gaps.

Air knives of the present invention can be manufactured using any material suitable for the intended application. An appropriate material can be determined without undue experimentation. Typically, air knives utilized in a $TiCl_4$ production process will be manufactured from a corrosion resistant alloy such as Inconel 600 or Inconel 601 (commercially available from various steel and alloy distributors).

Gases suitable for use with air knives of the present invention may depend on the particular application in which the air knife is used. However, appropriate gases can be determined without undue experimentation. Gases preferred for use with air knives in a $TiCl_4$ production process include air, nitrogen, argon, carbon dioxide or any other gas that will not appreciably react under the conditions prevailing in the air knife.

While the present invention has been described in detail with respect to specific embodiments thereof, it will be appreciated that those skilled in the art, upon attaining an understanding of the foregoing, may readily conceive of alterations to, variations of, and equivalents to these embodiments. For example, air knives of the present invention can be advantageously utilized in applications in addition to the production of $TiCl_4$. It is within the scope of the present invention to utilize the novel air knives of the present invention in many applications benefiting from the present invention's ability to reduce buildup of materials during transport from one vessel to another, such as through a tube or pipe. Accordingly, the scope of the present invention should be assessed as that of the appended claims and any equivalents thereto.

What is claimed is:

1. An air knife, comprising:
   a plurality of overlapping wall sections defining a passage having a circumference, the passage being adapted to allow solid materials to pass through the air knife in a first direction;
   at least two of the plurality of overlapping wall sections forming a gap between them; the gap facing in the first direction; and
   at least one gas intake connected to the gap in a manner causing gas entering the intake to pass through the gap and into the passage along the circumference of the passage.

2. The air knife of claim 1, wherein the circumference is circular.

3. The air knife of claim 1, wherein the gap is no more than about 0.07 inches.

4. The air knife of claim 1, wherein the gap is no more than about 0.05 inches.

5. The air knife of claim 1, wherein the air knife is connected to a pipe adapted to transport cyclone dust from a cyclone separator to a suspension vessel.

6. The air knife of claim 1, wherein the air knife is attached to a suspension vessel adapted to receive cyclone dust from a cyclone separator.

7. The air knife of claim 6, wherein the suspension vessel encloses a high-humidity environment.

8. A method for reducing buildup of solid material on the inside surface of a passage as the solid material passes through the passage, comprising:
   injecting a gas stream through a gap in the inside surface of the passage and along the inside surface of the passage in the direction the solid material is passing through the passage, wherein the passage is exposed to a high humidity environment located at a position downstream from the upstream end of the passage.

9. The method of claim 8, wherein the solid material is hygroscopic.

10. The method of claim 8, wherein the solid material is cyclone dust from a cyclone separator.

11. The method of claim 8, wherein the gas stream is injected at a velocity of at least about 100 feet per second.

12. The method of claim 8, wherein the gas stream is injected at a velocity of at least about 200 feet per second.

13. The method of claim 8, wherein the gas stream is injected at a velocity of at least about 400 feet per second.

14. The method of claim 8, wherein the solid material contains solid chlorides produced from reacting ore with chlorine.

15. The method of claim 8, wherein the solid material contains metal chlorides.

16. A method for reducing buildup of solid material on the inside surface of a passage as the solid material passes through the passage, comprising:
   injecting a gas stream through a gap in the inside surface of the passage and along the inside surface of the passage in the direction the solid material is passing through the passage,
wherein the passage is a pipe transporting cyclone dust from a cyclone separator to a suspension vessel, and wherein the gap in the inside surface of the passage is located at a position downstream from the cyclone separator.

17. The method of claim 16, wherein the cyclone dust contains solid chlorides produced from reacting ore with chlorine.

18. The method of claim 16, wherein the cyclone dust contains metal chlorides.

* * * * *

UNITED STATES PATENT AND TRADEMARK OFFICE
CERTIFICATE OF CORRECTION

PATENT NO.     : 6,752,858 B1
DATED          : June 22, 2004
INVENTOR(S)    : Harry E. Flynn, Joe B. Maker, Leslie E. Crowder and Johnny B. Perkins It is certified that error appears in the above-identified patent and that said Letters Patent is hereby corrected as shown below:

<u>Column 2,</u>
Line 38, delete "$FeC_2$" and insert -- $FeCl_2$ --, therefor.
Line 45, after "such" insert -- as --.

Signed and Sealed this

Twenty-first day of December, 2004

JON W. DUDAS
*Director of the United States Patent and Trademark Office*